United States Patent
Shafer et al.

(10) Patent No.: US 9,957,940 B2
(45) Date of Patent: May 1, 2018

(54) FLUID CONDITIONING MODULE

(71) Applicant: Caterpillar Inc., Peoria, IL (US)

(72) Inventors: Scott F. Shafer, Morton, IL (US); David E. Hackett, Washington, IL (US); Steven Y. Tian, Bloomington, IL (US); Martin Lehman, Congerville, IL (US)

(73) Assignee: Caterpillar Inc., Peoria, IL (US)

(*) Notice: Subject to any disclaimer, the term of this patent is extended or adjusted under 35 U.S.C. 154(b) by 46 days.

(21) Appl. No.: 14/589,154

(22) Filed: Jan. 5, 2015

(65) Prior Publication Data

US 2016/0195053 A1    Jul. 7, 2016

(51) Int. Cl.
| | | |
|---|---|---|
| *F02M 63/02* | (2006.01) |
| *F02M 37/18* | (2006.01) |
| *F02M 37/08* | (2006.01) |
| *F02M 37/00* | (2006.01) |
| *B01D 35/30* | (2006.01) |
| *F02B 3/06* | (2006.01) |
| *B01D 35/26* | (2006.01) |
| *F02M 37/22* | (2006.01) |

(52) U.S. Cl.
CPC ......... *F02M 63/0265* (2013.01); *B01D 35/26* (2013.01); *B01D 35/301* (2013.01); *F02B 3/06* (2013.01); *F02M 37/0052* (2013.01); *F02M 37/08* (2013.01); *F02M 37/18* (2013.01); *F02M 37/22* (2013.01); *F02M 63/0225* (2013.01); *F02M 37/007* (2013.01)

(58) Field of Classification Search
CPC .... F02M 63/0265; F02M 37/22; F02M 37/18; F02M 37/0052; F02M 37/08; F02M 63/0225; F02M 37/007; B01D 35/30; B01D 29/52; B01D 35/26; B01D 35/005; B01D 35/301; G05D 7/0682
See application file for complete search history.

(56) References Cited

U.S. PATENT DOCUMENTS

| | | |
|---|---|---|
| 5,900,155 A | 5/1999 | Bedi |
| 5,972,210 A | 10/1999 | Munkel |
| 6,358,022 B1 | 3/2002 | Frank et al. |

(Continued)

FOREIGN PATENT DOCUMENTS

| | | |
|---|---|---|
| CN | 102913734 | 2/2013 |
| CN | 204025018 | 12/2014 |

(Continued)

*Primary Examiner* — David C Mellon
*Assistant Examiner* — Liam Royce
(74) *Attorney, Agent, or Firm* — J. Randy Hibshman (57) ABSTRACT

A fluid conditioning system includes a first filter mount having a first filter inlet port and a first filter outlet port, a first motor, a first pump operatively coupled to the first motor, a second filter mount having a second filter inlet port, a second pump, and a controller operatively coupled to the first motor. The controller is configured to operate the first pump at a flowrate that is higher than a flowrate of the second pump. An outlet of the first pump is fluidly coupled to the first filter inlet port via a first filter inlet conduit, and an inlet of the first pump is fluidly coupled the first filter outlet port via a first filter outlet conduit. An inlet of the second pump is fluidly coupled to the first filter outlet port via the first filter outlet conduit.

18 Claims, 8 Drawing Sheets

(56) References Cited

U.S. PATENT DOCUMENTS

| | | | |
|---|---|---|---|
| 6,474,289 B1 | 11/2002 | Lilly et al. | |
| 6,758,656 B2 | 7/2004 | Maier et al. | |
| 7,112,278 B2 | 9/2006 | Yamada et al. | |
| 7,765,990 B2 | 8/2010 | Braun et al. | |
| 8,844,503 B2 | 9/2014 | Worthington et al. | |
| 8,888,658 B2 | 11/2014 | Pritchard | |
| 2004/0103883 A1 | 6/2004 | Geyer | |
| 2004/0118764 A1 | 6/2004 | Miller et al. | |
| 2007/0186877 A1 | 8/2007 | Schulz | |
| 2009/0025686 A1* | 1/2009 | Kato | F02M 59/022 |
| | | | 123/456 |
| 2009/0095689 A1 | 4/2009 | Keenan | |
| 2009/0145823 A1 | 6/2009 | Lauer et al. | |
| 2011/0048548 A1 | 3/2011 | Rahm | |
| 2011/0232270 A1 | 9/2011 | Burkitt | |
| 2012/0216778 A1 | 8/2012 | Fulton et al. | |
| 2012/0279590 A1 | 8/2012 | Wilkinson et al. | |
| 2012/0255521 A1 | 10/2012 | Aoki et al. | |
| 2013/0036738 A1 | 2/2013 | Pora | |
| 2013/0126408 A1 | 5/2013 | Konig et al. | |
| 2013/0287594 A1* | 10/2013 | Oyori | F02D 41/3845 |
| | | | 417/2 |
| 2014/0021118 A1 | 1/2014 | Shafer et al. | |
| 2014/0183112 A1 | 7/2014 | Ahmad | |
| 2014/0331974 A1 | 11/2014 | Ahmad et al. | |
| 2014/0373524 A1* | 12/2014 | Schuller | F16H 57/0413 |
| | | | 60/429 |
| 2015/0014254 A1 | 1/2015 | Jensen et al. | |

FOREIGN PATENT DOCUMENTS

| | | |
|---|---|---|
| CN | 104358557 | 2/2015 |
| EP | 1778960 | 1/2010 |
| JP | 621424 | 1/1987 |
| JP | 200831961 | 2/2008 |
| JP | 2013117186 | 6/2013 |
| KR | 1020100006366 | 1/2010 |
| KR | 101287156 | 7/2013 |
| WO | 2014/040863 A1 | 3/2014 |

\* cited by examiner

FLUID CONDITIONING MODULE

TECHNICAL FIELD

This patent disclosure relates generally to fluid conditioning systems and, more particularly, to fuel conditioning modules for combustion engines.

Reciprocating internal combustion (IC) engines are known for converting chemical energy stored in a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy from the mixture into heat. In turn, expansion of the combustion products within the variable volume performs work on the piston, which may be transferred to an output shaft of the IC engine.

Combustion engines may inject high pressure liquid fuel directly into the variable volume, and a liquid fuel delivery system may employ two or more fuel pumping stages in series to achieve the desired final injection pressure. For example, common rail fuel systems for direct injection compression ignition engines may include a fuel transfer pump that draws fuel from a fuel tank and delivers the fuel to the inlet of a high pressure common rail pump, which further increases the fuel pressure to the desired injection pressure.

Filters have been used to remove unwanted particulates, unwanted fluids (e.g., water), or both, from liquid fuel systems. For example, US Patent Publication No. US2004/0118764 ("the '764 publication") describes a multiple fuel filter pump module. The dual fuel filter pump module of the '764 publication draws a flow of fuel from a fuel tank and delivers one portion of the fuel flow to an engine fuel supply line, and directs another portion of the fuel flow to the fuel tank via a regulator fuel line for re-circulation through the fuel system. Although the fuel system described in the '764 publication may be used advantageously for some combustion engine applications, other fuel systems may be better tailored to meet the filtration performance and system packaging needs of other combustion engine applications.

Accordingly, there is a need for improved fuel systems to address the aforementioned concerns and/or other problems in the art.

SUMMARY

According to an aspect of the disclosure, a fluid conditioning system comprises a first filter mount having a first filter inlet port and a first filter outlet port; a first motor; a first pump operatively coupled to the first motor, an outlet of the first pump being fluidly coupled to the first filter inlet port via a first filter inlet conduit, an inlet of the first pump being fluidly coupled the first filter outlet port via a first filter outlet conduit; a second filter mount having a second filter inlet port; a second pump, an inlet of the second pump being fluidly coupled to the first filter outlet port via the first filter outlet conduit, an outlet of the second pump being fluidly coupled to the second filter inlet port via a second filter inlet conduit; and a controller operatively coupled to the first motor, the controller being configured to operate the first pump at a flowrate that is higher than a flowrate of the second pump.

According to another aspect of the disclosure, a fluid conditioning module comprises a block defining a first filter inlet port, a first filter outlet port, a second filter inlet port, and a second filter outlet port; a first pump fastened to the block, an outlet of the first pump being fluidly coupled to the first filter inlet port via a first filter inlet conduit defined by the block, an inlet of the first pump being fluidly coupled to the first filter outlet port via a first filter outlet conduit defined by the block; and a second pump fastened to the block, an outlet of the second pump being fluidly coupled to the second filter inlet port via a second filter inlet conduit defined by the block, an inlet of the second pump being fluidly coupled to the first filter outlet port via the first filter outlet conduit.

According to another aspect of the disclosure, a method for conditioning a fluid includes comprises pumping a fluid flow through a first pump; filtering the fluid flow through a first filter; recirculating a first portion of the fluid flow through the first filter via the first pump; pumping a second portion of the fluid flow through a second pump, the second portion of the fluid flow being less than the first portion of the fluid flow; and filtering the second portion of the fluid flow through a second filter.

According to another aspect of the disclosure, a fluid conditioning module comprises a block, a first pump fastened to the block, a second pump fastened to the block, a first filter removably coupled to the block, an inlet of the first filter being fluidly coupled to an outlet of the first pump via a first filter inlet conduit defined by the block, an outlet of the first filter being fluidly coupled to an inlet of the first pump via a first filter outlet conduit, and a second filter removably coupled to the block, an inlet of the second filter being fluidly coupled to an outlet of the second pump via a second filter inlet conduit defined by the block, an inlet of the second pump being fluidly coupled to the outlet of the first filter via the first filter outlet conduit.

DETAILED DESCRIPTION

Aspects of the disclosure will now be described in detail with reference to the drawings, wherein like reference numbers refer to like elements throughout, unless specified otherwise.

Figure 1:
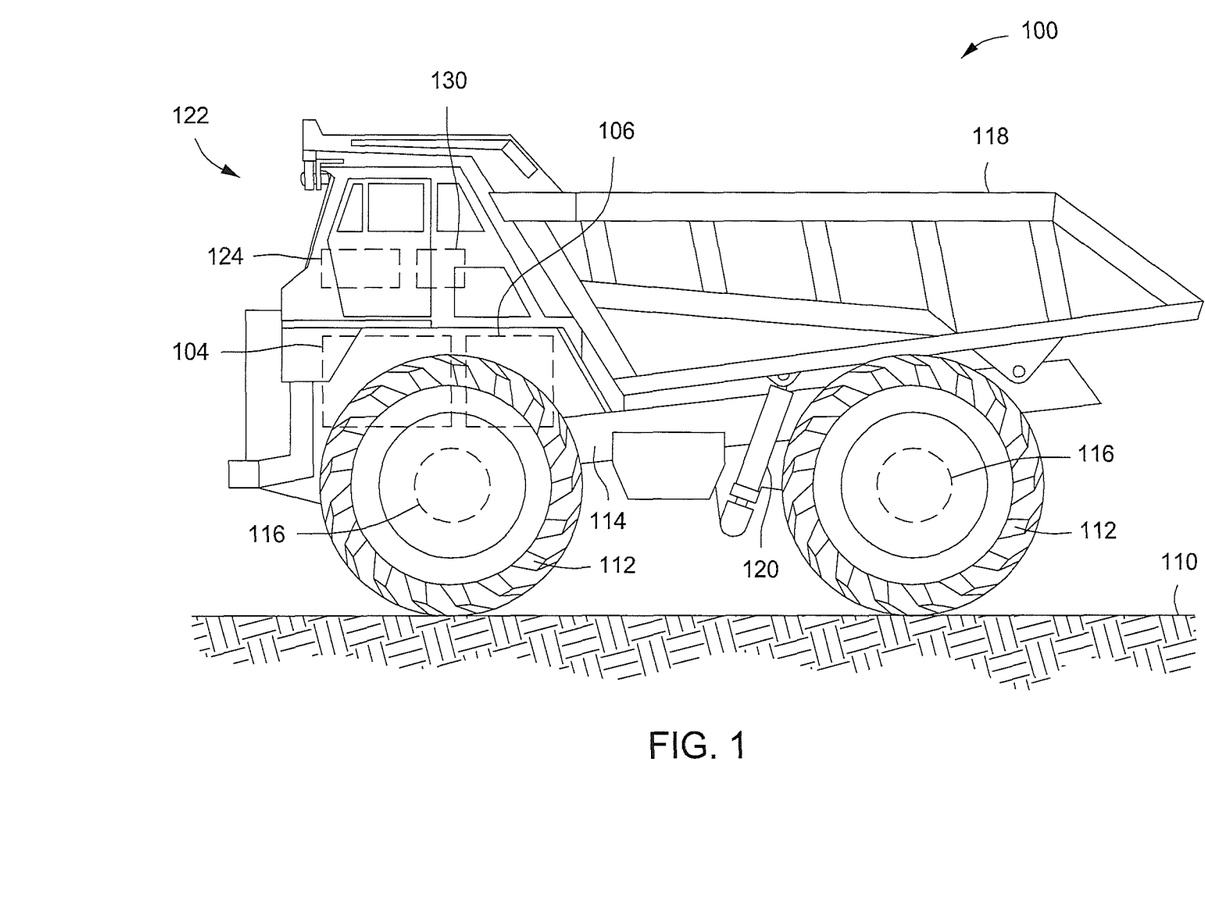
FIG. 1 shows a side view of a machine, according to an aspect of the disclosure.

FIG. 1 shows a side view of a machine 100, according to an aspect of the disclosure. The machine 100 includes an internal combustion (IC) engine 104 that is fluidly coupled to a fuel supply system 106. The IC engine 104 maybe a reciprocating internal combustion engine, such as a compression ignition engine or a spark ignition engine, for example, or a rotating internal combustion engine, such as a gas turbine, for example.

The machine 100 may be propelled over a work surface 110 by wheels 112 coupled to a chassis 114. The wheels 112 may be driven by motors 116, a mechanical transmission coupled to the IC engine 104, or combinations thereof. It will be appreciated that the machine 100 could also be propelled by tracks (not shown), combinations of wheels 112 and tracks, or any other surface propulsion device known in the art. Alternatively, the machine 100 could be a stationary machine, and therefore may not include a propulsion device.

The machine 100 may also include a work implement 118 driven by an actuator 120. The work implement 118 could be a dump bed, a shovel, a drill, a fork lift, a feller-buncher, a conveyor, or any other implement known in the art for performing work on a load. The actuator 120 may be a hydraulic actuator, such as a linear hydraulic motor or a rotary hydraulic motor, an electric motor, a pneumatic actuator, or any other actuator known in the art.

The machine may include a cab 122 configured to accommodate an operator, and have a user interface 124 including using input devices for asserting control over the machine 100. The user interface 124 may include pedals, wheels, joysticks, buttons, touch screens, combinations thereof, or any other user input device known in the art. Alternatively or additionally, the user interface 124 may include provisions for receiving control inputs remotely from the cab 122, including wired or wireless telemetry, for example. The IC engine 104, the fuel supply system 106, and the user interface 124 may be operatively coupled to one another via a machine controller 130.

The machine can be an "over-the-road" vehicle such as a truck used in transportation or may be any other type of machine that performs some type of operation associated with an industry such as mining, construction, farming, transportation, or any other industry known in the art. For example, the machine may be an off-highway truck; an earth-moving machine, such as a wheel loader, an excavator, a dump truck, a backhoe, a motor grader, or a material handler; a marine vehicle or machine; a locomotive; or any other machine known in the art. The term "machine" can also refer to stationary equipment, such as a generator that is driven by an internal combustion engine to generate electricity. The specific machine 100 illustrated in FIG. 1 is a dump truck having a dump bed 118 actuated by a linear hydraulic cylinder 120.

Figure 2:
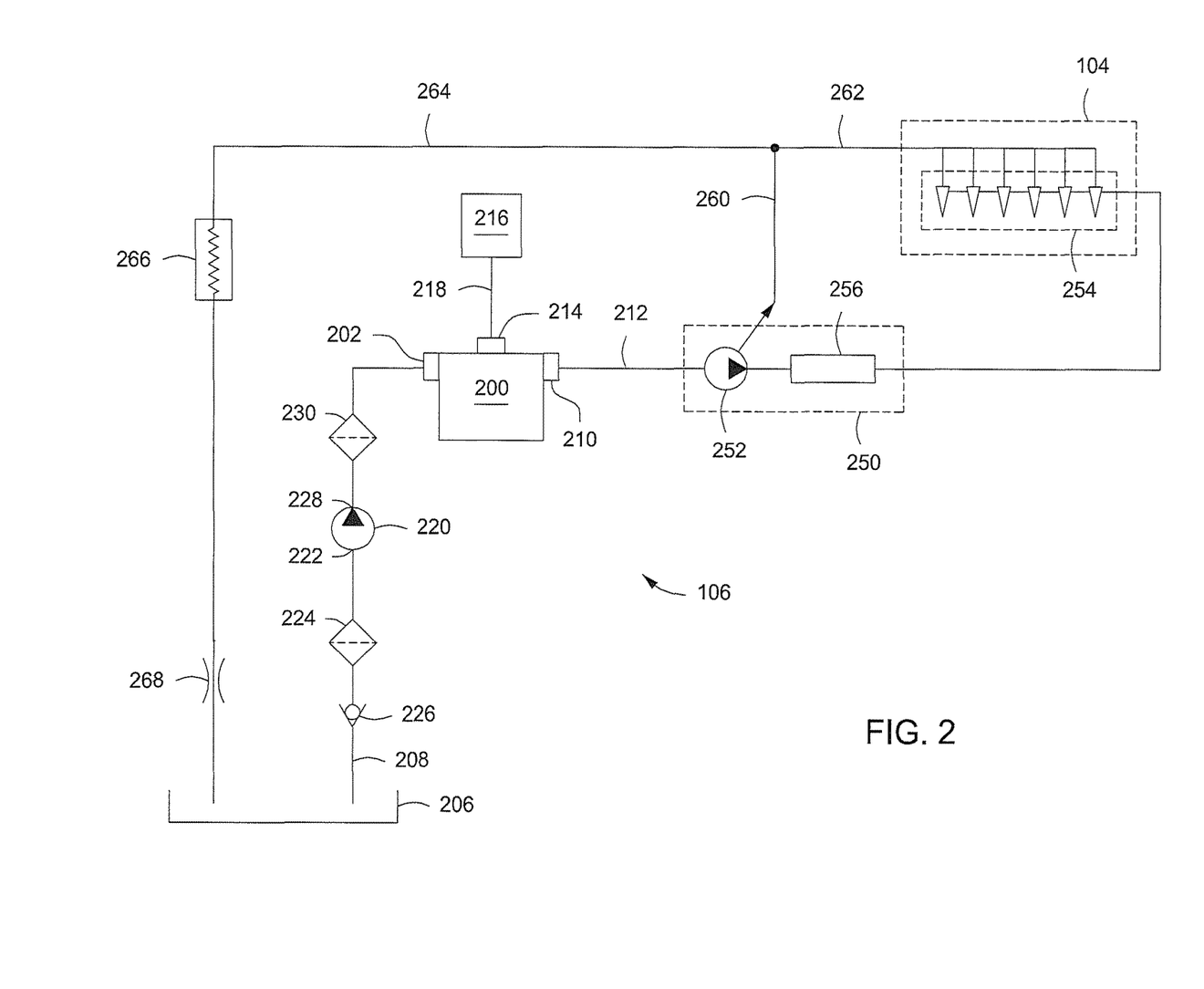
FIG. 2 shows a schematic view of a fuel supply system, according to an aspect of the disclosure.

FIG. 2 shows a schematic view of a fuel supply system 106, according to an aspect of the disclosure. The fuel supply system 106 includes a fluid conditioning module 200 having an inlet port 202 that is in fluid communication with a fuel reservoir 206 via a fuel suction conduit 208. An outlet port 210 of the fluid conditioning module 200 may be in fluid communication with the IC engine 104 via a module outlet conduit 212. The fluid conditioning module 200 may include pumps, valves, filters, sensors, heaters, coolers, controllers, combinations thereof, or any other structures known in the art to be beneficial to conditioning a fluid.

A power port 214 of the fluid conditioning module 200 is operatively coupled to a power source 216 via a power conduit 218. The power source 216 may be an electrical power source, a hydraulic power source, a pneumatic power source, a shaft power source, combinations thereof, or any other power source known in the art. The power conduit 218 may include an electrical conductor, a fluid conduit, a shaft, or any other means for transmitting power known in the art.

According to an aspect of the disclosure, the power source 216 is an electrical power source, and the power conduit 218 consists of one or more electrical conductors.

The fluid conditioning module 200 may be fluidly coupled to the fuel reservoir 206 via a low-pressure transfer pump 220, which takes suction from the fuel reservoir 206 via the fuel suction conduit 208. Alternatively, the fluid conditioning module 200 includes a pump, and the fuel reservoir 206 may provide sufficient net positive suction head to the fluid conditioning module 200 such that the low-pressure transfer pump 220 is not necessary, and is therefore not included in the fuel supply system 106.

An inlet 222 of the low-pressure transfer pump 220 may be fluidly coupled to the fuel reservoir 206 via a filter or strainer 224, a check valve 226, or both. Alternatively or additionally, an outlet 228 of the low-pressure transfer pump 220 may be fluidly coupled to the inlet port 202 of the fluid conditioning module 200 via a filter or strainer 230. Further, it will be appreciated that the inlet port 202 of the fluid conditioning module 200 may be fluidly coupled to the fuel reservoir 206 via the filter or strainer 224, the check valve 226, or both, independent of whether the fuel supply system 106 includes the low-pressure transfer pump 220. The check valve 226 is configured to allow flow through the suction conduit 208 only in a direction from the fuel reservoir 206 toward the fluid conditioning module 200.

According to the aspect illustrated in FIG. 2, the outlet port 210 of the fluid conditioning module 200 is fluidly coupled to the IC engine 104 via a high-pressure pump system 250, which includes a high-pressure pump 252. The high-pressure pump 252 may be a high-pressure unit pump that is coupled to a single fuel injector of the IC engine 104, or a high-pressure common rail pump that is fluidly coupled to two or more fuel injectors 254 of the IC engine 104 via a common rail 256. Therefore, according to an aspect of the disclosure, the fluid conditioning module 200 is in fluid communication with the IC engine 104 via at least one pump disposed downstream of the outlet port 210 of the fluid conditioning module 200 along a direction of fuel flow through the module outlet conduit 212.

The fuel reservoir 206 may be in fluid communication with a pump drain conduit 260, a fuel injector drain conduit 262, or both, via a return conduit 264. The return conduit 264 may optionally include a heat exchanger 266 that is configured to transfer heat away from a flow of fuel through the return conduit 264. Further, the return conduit 264 may include an air bleed device 268 for separating gases from liquid fuel flowing through the return conduit 264 upstream of the fuel reservoir 206. The fuel reservoir 206 may be a liquid fuel reservoir that supplies one or more liquid fuels to the IC engine 104, such as, distillate diesel, biodiesel, dimethyl ether, seed oils, ethanol, methanol, combinations thereof, or any other combustible liquid known in the art.

Although the fluid conditioning module 200 is shown in the context of a fuel supply system 106 in FIG. 2, it will be appreciated that the fluid conditioning module 200 could be used to condition other fluids, such as, hydraulic fluid, coolant, water, lubricating oil, combinations thereof, or any other fluid known in the art. Unless specified otherwise, the term "fluid" is used herein to describe gases, liquids, slurries, combinations thereof, or other similar matter that tends to flow in response to applied sheer stress.

Figure 3:
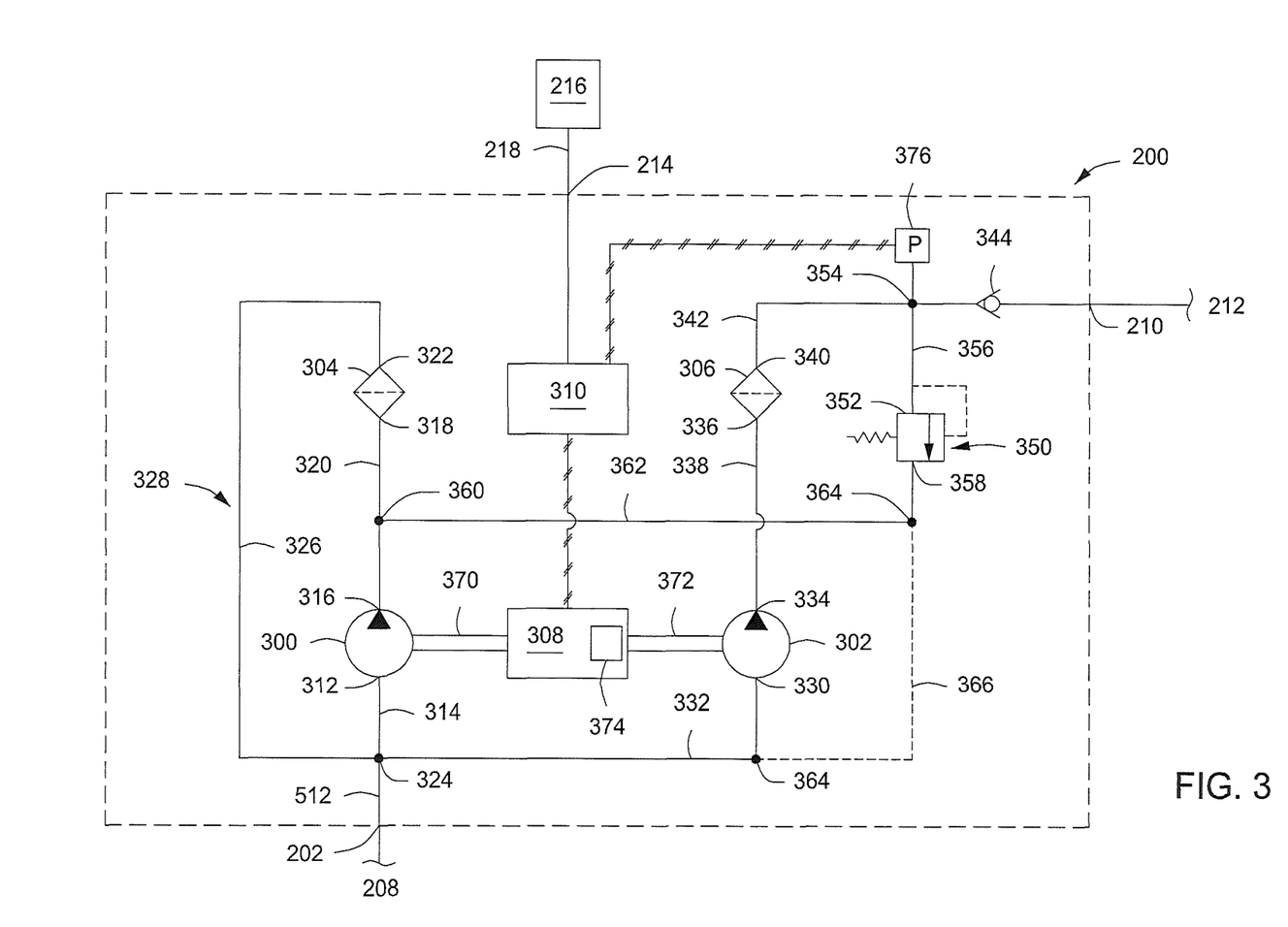
FIG. 3 shows a schematic view of a fluid conditioning module, according to an aspect of the disclosure.

FIG. 3 shows a schematic view of a fluid conditioning module 200, according to an aspect of the disclosure. The fluid conditioning module 200 includes a first pump 300, a second pump 302, a first filter 304, a second filter 306, a motor 308, and a module controller 310.

An inlet 312 to the first pump 300 is fluidly coupled to the inlet port 202 of the fluid conditioning module 200, and therefore the fuel suction conduit 208, via a first pump inlet conduit 314. An outlet 316 from the first pump 300 is fluidly coupled to an inlet port 318 of the first filter 304 via a first filter inlet conduit 320. An outlet port 322 of the first filter 304 is fluidly coupled to the first pump inlet conduit 314 at a node 324 via a first filter outlet conduit 326. Accordingly, the first filter inlet conduit 320, the first filter outlet conduit 326, and the first pump inlet conduit 314 form a fluid recirculation loop 328 about the first pump 300, which includes the first filter 304.

An inlet 330 to the second pump 302 is fluidly coupled to the node 324 via a second pump inlet conduit 332. In turn, the inlet 330 of the second pump 302 is fluidly coupled to the first filter outlet conduit 326 and the inlet port 202 of the fluid conditioning module 200 via the second pump inlet conduit 332. According to an aspect of the disclosure, the first pump 300 may be a turbomachine, such as, for example, a centrifugal pump. According to another aspect of the disclosure, the second pump 302 may have a positive displacement design, such as, for example a gerotor or external gear pump construction. However, it will be appreciated that either the first pump 300 or the second pump 302 may be a turbomachine, a positive displacement pump, or any other pump known in the art, to satisfy the needs of a particular application.

An outlet 334 from the second pump 302 is fluidly coupled to an inlet port 336 of the second filter 306 via a second filter inlet conduit 338. An outlet port 340 of the second filter 306 is fluidly coupled to the outlet port 210 of the fluid conditioning module 200 via a second filter outlet conduit 342. The second filter outlet conduit 342 may include a check valve 344 that is configured to allow flow only in a direction from the second filter 306 toward the outlet port 210 of the fluid conditioning module 200.

The fluid conditioning module 200 may include a pressure regulating valve 350 having an inlet 352 that is fluidly coupled to the second filter outlet conduit 342 at a node 354 via a regulating valve inlet conduit 356. Although FIG. 2 shows the node 354 located upstream of the check valve 344, it will be appreciated that the node 354 could be located anywhere along the second filter inlet conduit 338 and the second filter outlet conduit 342.

An outlet 358 of the pressure regulating valve 350 is fluidly coupled to the first filter inlet conduit 320 at a node 360 via a first drain conduit 362. Accordingly, the outlet 358 of the pressure regulating valve 350 is fluidly coupled to the inlet port 318 of the first filter 304 via the first drain conduit 362. Alternatively or additionally, the outlet 358 of the pressure regulating valve 350 may be fluidly coupled to the second pump inlet conduit 332 at a node 364 via a second drain conduit 366. In turn, the outlet 358 of the pressure regulating valve 350 may be in fluid communication with the inlet 312 to the first pump 300 and the inlet to the second pump 302 via the second drain conduit 366.

The pressure regulating valve 350 has a first configuration that blocks fluid communication between the inlet 352 and the outlet 358 of the pressure regulating valve 350, and a second configuration that effects fluid communication between the inlet 352 and the outlet 358 of the pressure regulating valve 350. Further, the pressure regulating valve 350 may actuate between its first configuration and its second configuration based on a difference between the pressure at the inlet 352 and a predetermined threshold value. According to an aspect of the disclosure, the pressure regulating valve 350 may toggle from its first configuration to its second configuration when the pressure at the inlet 352 exceeds a predetermined threshold value. According to another aspect of the disclosure, the pressure regulating valve 350 may operate proportionally between its first configuration and a wide open position based on a difference between the pressure at the inlet 352 and a predetermined threshold value.

The first pump 300 is operatively coupled to the motor 308 via a first shaft 370 for transmission of shaft power therebetween, and the second pump 302 is operatively coupled to the motor 308 via a second shaft 372 for transmission of shaft power therebetween. The motor 308 may be powered by electrical power, hydraulic power, pneumatic power, combinations thereof, or any other motor power source known in the art.

According to an aspect of the disclosure, the motor 308 is configured to drive the first shaft 370 at the same angular velocity as the second shaft 372. According to another aspect of the disclosure, the motor 308 may include gearing 374 operatively coupled to the first shaft 370, the second shaft 372, or both, such that an angular velocity for the first shaft 370 is different from the angular velocity of the second shaft according to a prescribed relationship as a function of the angular velocity of the motor 308.

The motor 308 is operatively coupled to the module controller 310 for control thereof, and the module controller 310 is operatively coupled to the power source 216 at the power port 214 via the power conduit 218, as described previously. The fluid conditioning module 200 may include a pressure sensor 376 that is in fluid communication with the second filter outlet conduit 342, and operatively coupled to the module controller 310 for transmission of data signals, power, or both, therebetween. Accordingly, the module controller 310 may exchange data signals, power transmission, or both, with the motor 308 or the pressure sensor 376.

According to an aspect of the disclosure, the motor 308 is a variable speed motor and the module controller 310 is configured to vary a rotational speed of the motor 308. Further, the module controller 310 may be configured to vary a speed of the motor 308 based on a comparison between a pressure signal from the pressure sensor 376 and a predetermined threshold value. According to another aspect of the disclosure, the motor 308 is a constant speed motor, and the module controller 310 is configured to actuate the motor 308 between a stopped condition and a fixed-speed condition.

The module controller 310 may be any purpose-built processor for effecting control of the fluid conditioning module 200. It will be appreciated that the module controller 310 may be embodied in a single housing, or a plurality of housings distributed throughout the fluid conditioning module 200. Further, the module controller 310 may include power electronics, preprogrammed logic circuits, data processing circuits, volatile memory, non-volatile memory, software, firmware, input/output processing circuits, combinations thereof, or any other controller structures known in the art.

Figure 4:
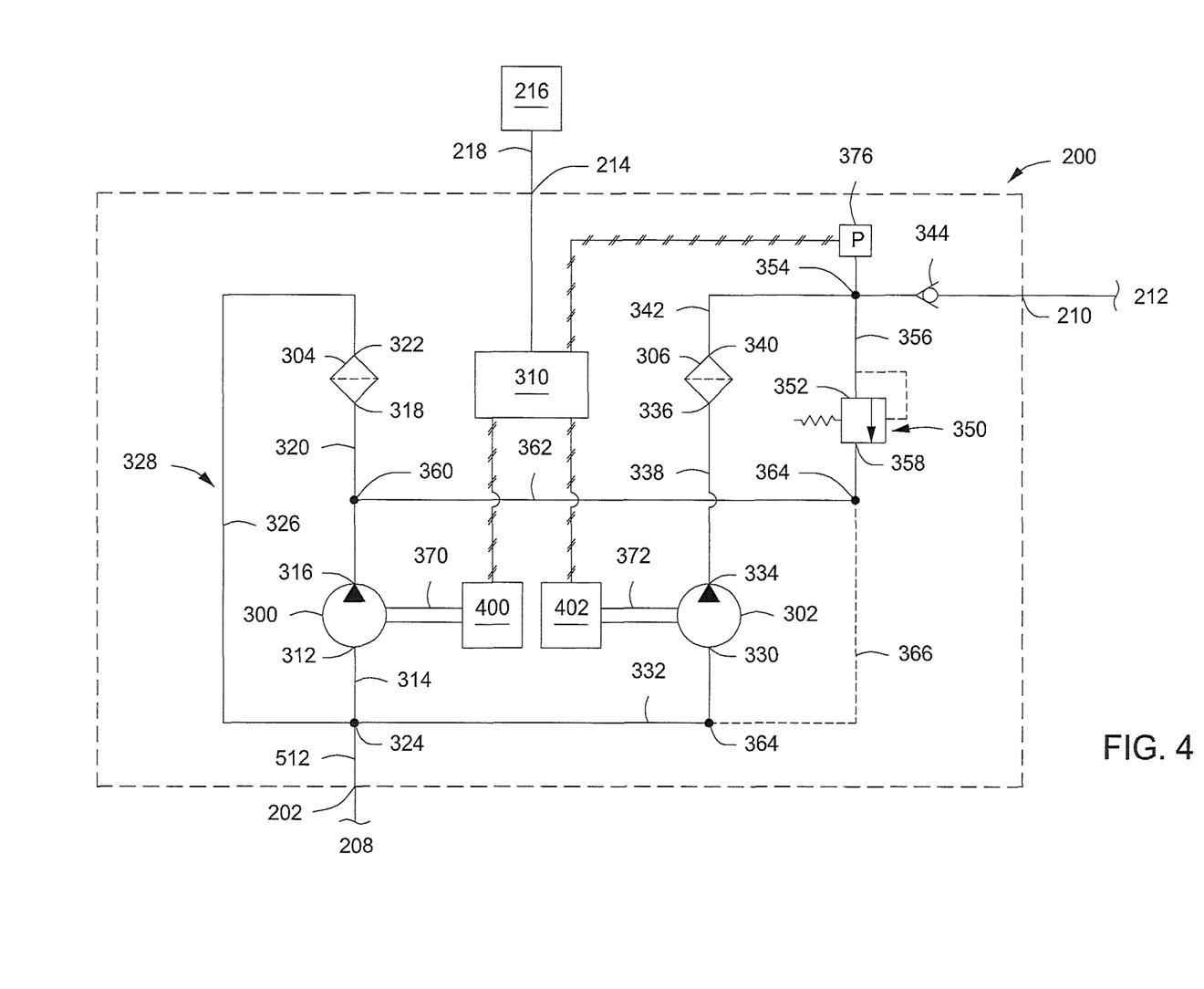
FIG. 4 shows a schematic view of a fluid conditioning module, according to an aspect of the disclosure.

FIG. 4 shows a schematic view of a fluid conditioning module 200, according to an aspect of the disclosure. Similar to the fluid conditioning module 200 in FIG. 3, the fluid conditioning module 200 in FIG. 4 includes the first pump 300, the second pump 302, the first filter 304, the second filter 306, and the module controller 310. However, the fluid conditioning module 200 in FIG. 4 further includes a first motor 400 operatively coupled to the first pump 300 via the first shaft 370, and a second motor 402 operatively coupled to the second pump 302 via the second shaft. The first motor 400 and the second motor 402 may each be operatively coupled to the module controller 310 for control thereof. Either of the first motor 400 or the second motor 402 may be powered by electrical power, hydraulic power, pneumatic power, or any other motor power source known in the art. According to an aspect of the disclosure, the first shaft 370 is free from any mechanical coupling with the second shaft 372 that would prohibit rotation of the first shaft 370 independent of rotation with the second shaft 372.

The first motor 400 and the second motor 402 may embody various combinations of fixed-speed and variable-speed characteristics as outlined below. According to an aspect of the disclosure, both the first motor 400 and the second motor 402 are variable speed motors, and the module controller 310 is configured to operate each of the first motor 400 and the second motor 402 at speeds independent of one another. According to another aspect of the disclosure, the first motor 400 is a variable speed motor and the second motor 402 is a fixed speed motor, and the module controller 310 is configured to operate the first motor 400 at a speed that is independent of a speed of the second motor 402. According to another aspect of the disclosure, the first motor 400 is a fixed speed motor and the second motor 402 is a variable speed motor, and the module controller 310 is configured to operate the second motor 402 at a speed that is independent of a speed of the first motor 400.

According to another aspect of the disclosure, both the first motor 400 and the second motor 402 are fixed speed motors, and the controller is configured to operate the first motor 400 and the second motor 402 independent of one another. It will be appreciated that the first motor 400 may have a fixed operating speed that is the same as or different from a fixed operating speed of the second motor 402.

Figure 5:
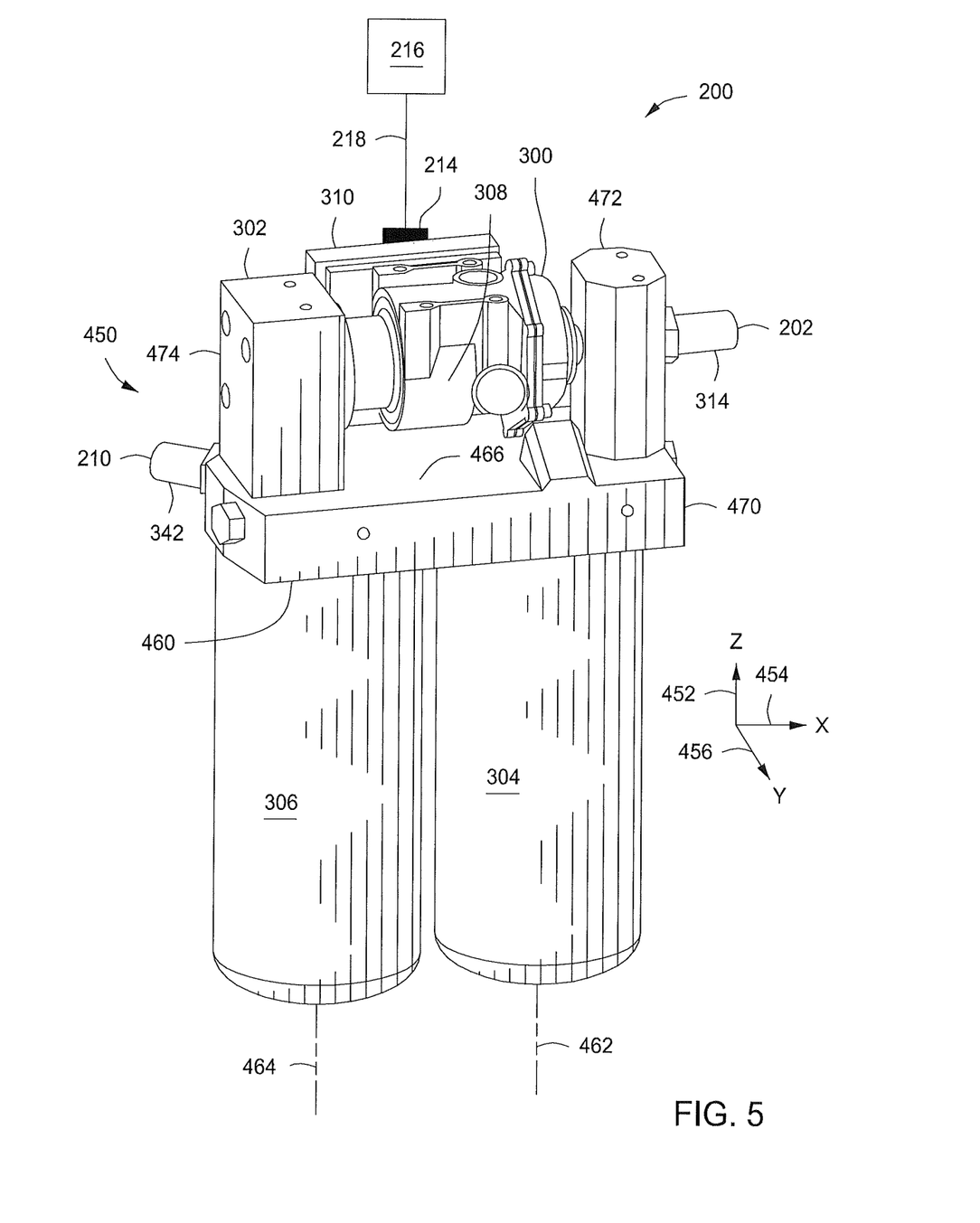
FIG. 5 shows a perspective view of a fluid conditioning module, according to an aspect of the disclosure.

FIG. 5 shows a perspective view of a fluid conditioning module 200, according to an aspect of the disclosure. The fluid conditioning module 200 may include a block 450 that functions to provide points of attachment for any of the components of the fluid conditioning module 200, to define fluid passages to effect fluid communication between components of the fluid conditioning module 200, or combinations thereof. It will be appreciated that the block 450 may be formed and consist of a single unitary part, or alternatively, the block 450 may include a plurality of parts fastened to one another by threaded fasteners, rivets, welding, brazing, interference fits, combinations thereof, or any other material fasteners or techniques known in the art.

In FIG. 5, a height or vertical direction 452 extends along the z-axis, a width direction 454 extends along the x-axis, and a depth direction 456 extends along the y-direction, where the x-axis, the y-axis, and the z-axis may all be mutually normal or perpendicular to one another.

The first filter 304 and the second filter 306 are each mounted to a lower surface 460 of the block 450. A longitudinal axis 462 of the first filter 304 and a longitudinal axis 464 of the second filter 306 may each extend away from the lower surface 460 of the block along the height direction 452. The longitudinal axis 462 of the first filter 304 may be substantially parallel to the longitudinal axis 464 of the second filter 306. Further, the longitudinal axis 462 of the first filter 304 and the longitudinal axis 464 of the second filter 306 may each lie in a plane defined by the width direction 454 and the height direction 452.

The block 450 may define the inlet port 202, the outlet port 210, or both, of the fluid conditioning module 200. It will be appreciated that the block 450 may include fluid fittings coupled thereto, and that such fluid fittings may be said to part of the block 450 and define the inlet port 202, the outlet port 210, or both.

As shown in FIG. 5, the block 450 includes a first block portion 470, a second block portion 472 fastened to the upper surface 466 of the first block portion 470, and a third block portion 474 fastened to the upper surface 466 the first block portion 470. The second block portion 472 and the third block portion 474 each extend away from the upper surface 466 of the first block portion 470 along the height direction 452. Alternatively, it will be appreciated that combinations of the first block portion 470, the second block portion 472, and third block portion may be machined, cast, or otherwise formed as a single unitary piece.

The second pump 302 may be disposed at least partly within the third block portion 474. According to an aspect of the disclosure, the second pump 302 is disposed completely within the third block portion 474, except for the second shaft 372, which may extend outside the third block portion 474 to the motor 308. As discussed below, each of the first block portion 470, the second block portion 472, and the third block portion 474 may define fluid passages therein, thereby effecting fluid communication between the various components of the fluid conditioning module 200.

The first pump 300, the second pump 302, and the motor 308 are shown fastened to an upper surface 466 of the first block portion 270, where the upper surface 466 of the block 450 is opposite the lower surface 460 of the block along the height direction 452. The first pump 300, the second pump 302, and the motor 308 may be fastened to the block 450 by threaded fasteners, or any other fasteners known in the art. Although only one motor 308 is shown in FIG. 5, it will be appreciated that the motor 308 could be replaced by the first motor 400 and the second motor 402 shown schematically in FIG. 4, without changing the arrangement of the first pump 300, the first shaft 370, the second pump 302, and the second shaft 372 along the width direction 454.

The second block portion 472 and the third block portion 474 each extend away from the upper surface 466 of the first block portion 470 along the height direction 452. The second pump 302 may be disposed at least partly within the third block portion 474. According to an aspect of the disclosure, the second pump 302 is disposed completely within the third block portion 474, except for the second shaft 372, which extends outside the third block portion 474 to the motor 308.

The module controller 310 may be fastened to the motor 308, or otherwise fastened to the block 450, either directly or indirectly through another component. As discussed previously, the module controller 310 receives power from a power source 216 via a power conduit 218 coupled to the power port 214 of the fluid conditioning module 200.

Figure 6:
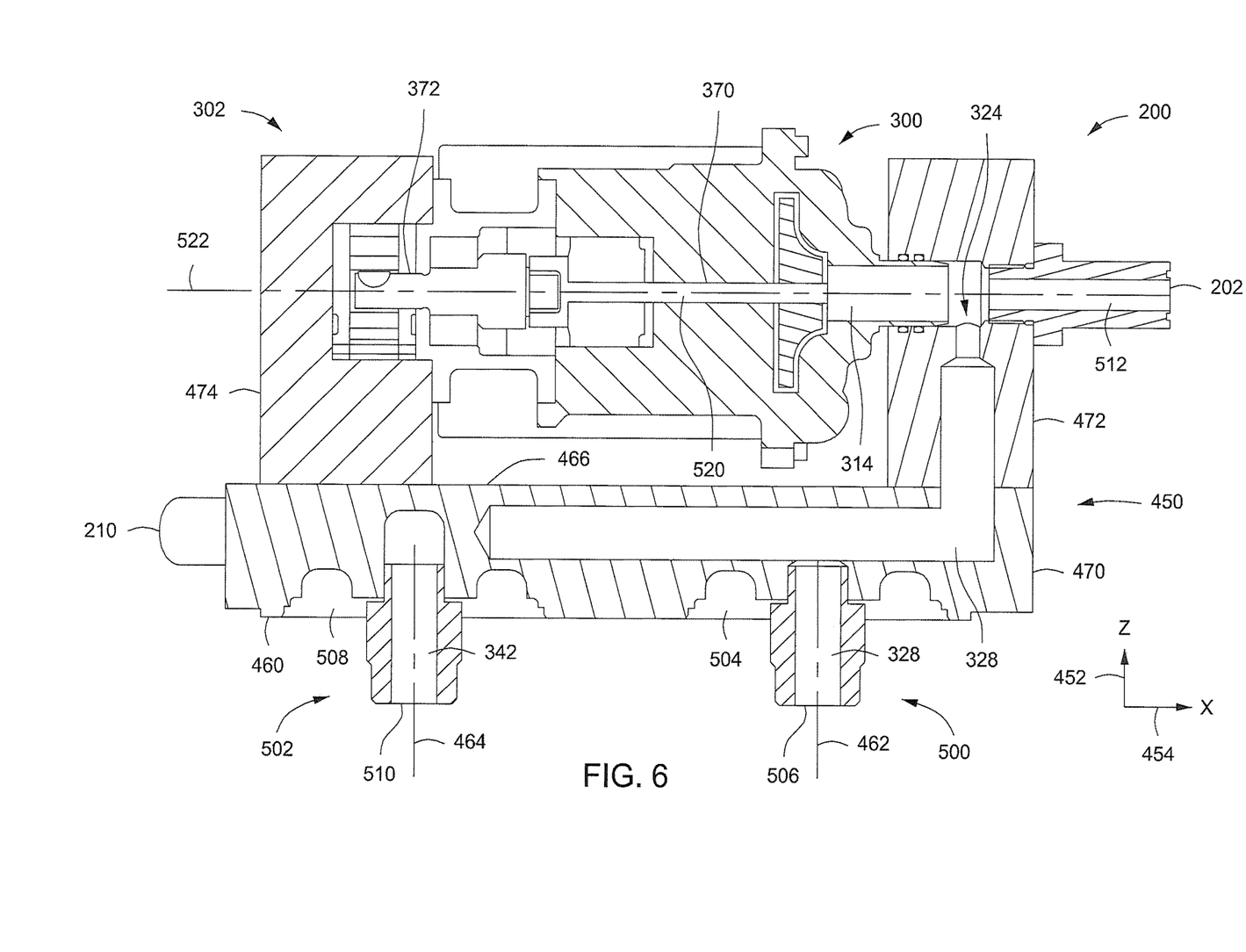
FIG. 6 shows a partial cross sectional view of the fluid conditioning module illustrated in FIG. 5, according to an aspect of the disclosure.
Figure 7:
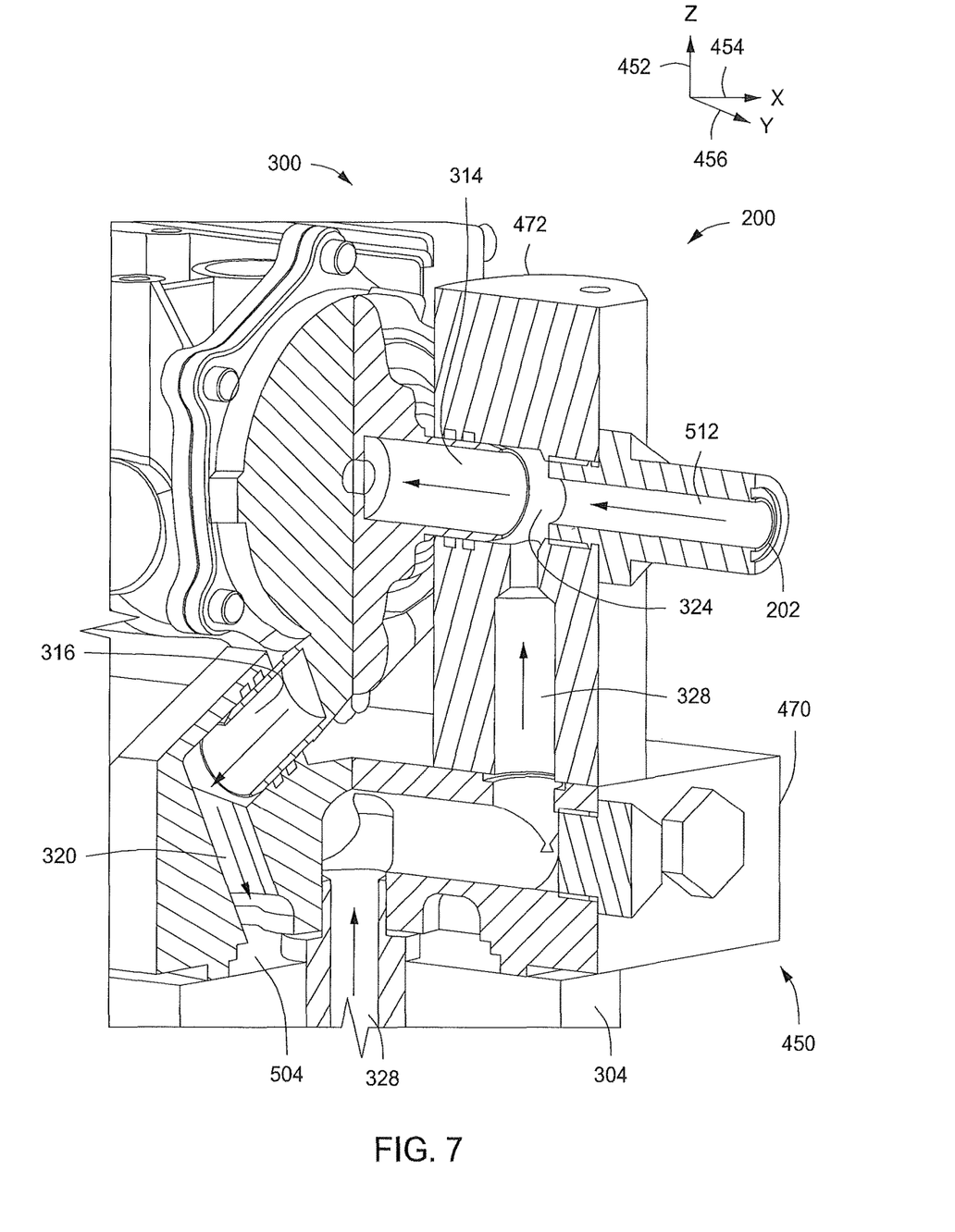
FIG. 7 shows a partial cross sectional view of the fluid conditioning module illustrated in FIG. 5, according to an aspect of the disclosure.
Figure 8:
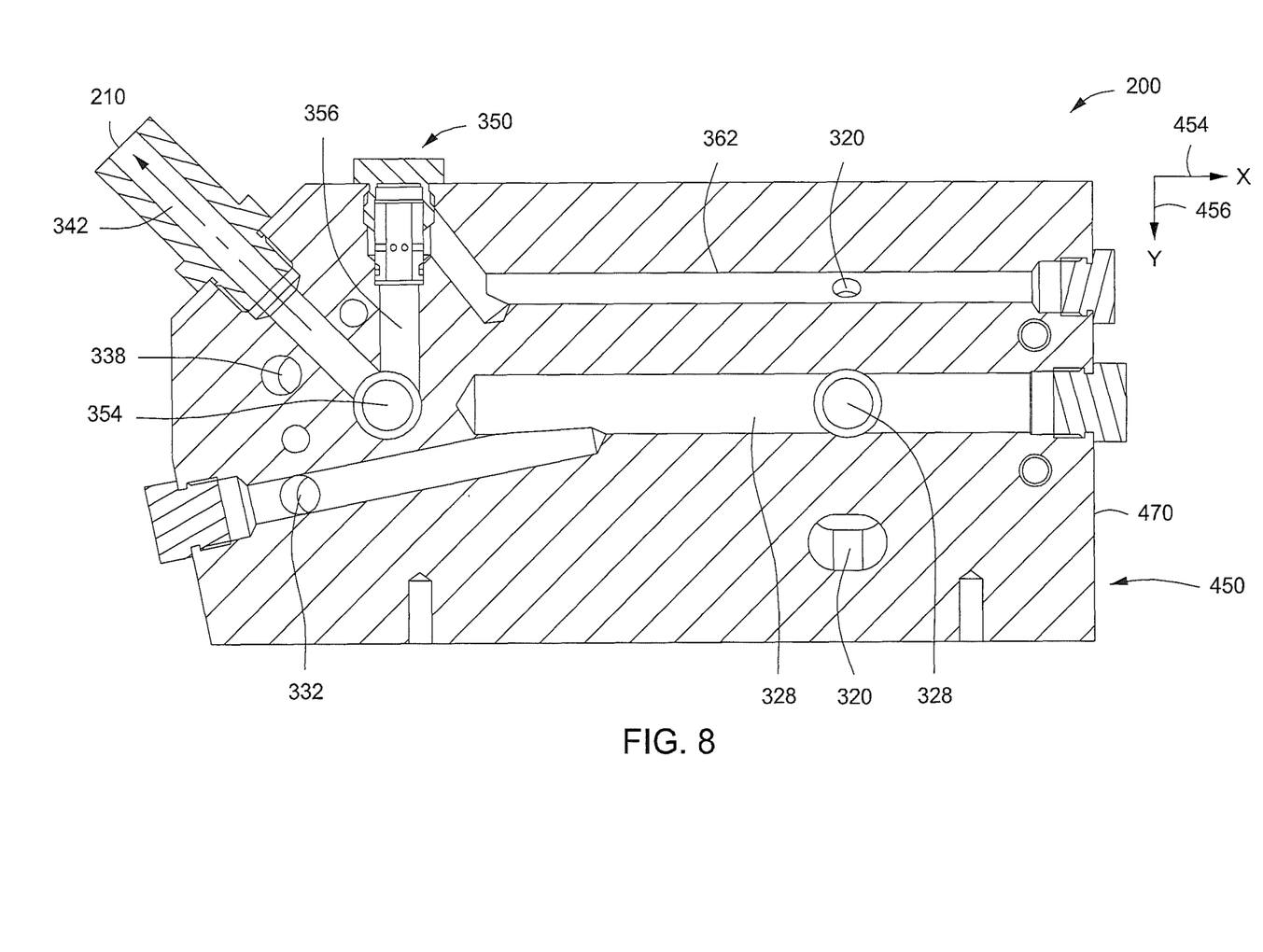
FIG. 8 shows a partial cross sectional view of the fluid conditioning module illustrated in FIG. 5, according to an aspect of the disclosure.

Referring now to FIGS. 6-8, FIG. 6 shows a partial cross sectional view of the fluid conditioning module 200 illustrated in FIG. 5, according to an aspect of the disclosure; FIG. 7 shows a partial cross sectional view of the fluid conditioning module 200 illustrated in FIG. 5, according to an aspect of the disclosure; and FIG. 8 shows a partial cross sectional view of the fluid conditioning module 200 shown in FIG. 5, according to an aspect of the disclosure.

In FIG. 6, the fluid conditioning module 200 is shown without the first filter 304 and the second filter 306, to illustrate the a first filter mount 500 and a second filter mount 502, defined by the lower surface 460 of the block 450. The first filter mount 500 may define a first filter inlet aperture or port 504, which may effectively define a downstream terminal end of the first filter inlet conduit 320 (see FIG. 8), and may define a first filter outlet aperture or port 506, which may effectively define an upstream terminal end of the first filter outlet conduit 326. The second filter mount 502 may define a second filter inlet aperture or port 508, which may effectively define a downstream terminal end of the second filter inlet conduit 338 (see FIG. 3), and may define a second filter outlet aperture or port 510, which may effectively define an upstream terminal end of the second filter outlet conduit 342. The first filter mount 500 and the second filter mount 502 may also include filter fastening features, such as, for example, internal threads, external threads, clamps, or other filter fastening structures known in the art.

Each of the first block portion 470, the second block portion 472, and the third block portion 474 may define fluid passages therein, thereby effecting fluid communication between the various components of the fluid conditioning module 200. For example, as shown in FIGS. 6 and 7, the second block portion 472 may define the fluid node 324 therein, such that the second block portion 472 effects fluid communication between the first filter outlet conduit 326, the first pump inlet conduit 314, the second pump inlet conduit 332 (see FIG. 7), and a module inlet conduit 512. Further as shown in FIG. 8, the first block portion 470 may define the fluid node 354 therein, such that the first block portion 470 effects fluid communication between the second filter outlet conduit 342 and the first drain conduit 362 via the pressure regulating valve 350.

Referring to FIG. 6, a longitudinal axis 520 of the first shaft 370 may be substantially parallel with a longitudinal axis 522 of the second shaft 372. According to another aspect of the disclosure, the longitudinal axis 520 of the first shaft 370 may be substantially collinear with the longitudinal axis 522 of the second shaft 372. Further, each of the longitudinal axis 520 of the first shaft 370 and the longitudinal axis 522 of the second shaft 372 may be substantially aligned with the width direction 454.

INDUSTRIAL APPLICABILITY

The present disclosure is applicable to fluid conditioning systems and, more particularly, to fuel conditioning modules for combustion engines.

Fuel injection pressures for direct injection compression ignition engines have increased over time at least partly in response to more stringent emissions regulations and incentives to improve fuel economy. And in response to this trend, Applicants have discovered that fuel injection system designs for higher injection pressures may exhibit higher sensitivity to fuel cleanliness, especially with respect to fuel-borne particulates. Further, the increased particulate sensitivity extends not only to the total volume fraction of particulates in the fuel, but also the maximum tolerable particle size. In turn, improved fuel filtration and conditioning systems can improve component service life through mitigation of surface wear and scuffing, heat-induced wear, or combinations thereof.

While conventional methods exist for improving filtration of fuel in a machine 100, Applicants recognized that the conventional methods tend to be bulky and expensive. As a result, Applicants have developed improvements to the conventional filtering methods within current design constraints for product packaging, cost, and maintainability, as described herein.

Referring to FIGS. 3 and 4, aspects of the disclosure provide a fluid conditioning module 200 including a first pump 300 operating in a fluid recirculation loop 328 with a first filter 304, in addition to a second pump 302 for delivering fuel from the fluid recirculation loop 328 to an engine 104 via a second filter 306. Applicants discovered that improved fuel filtering could be achieved within the aforementioned packaging, cost, and maintainability constraints by operating the first pump 300 a flow rate that is at least twice as high as the flow rate through the second pump 302. According to an aspect of the disclosure, the flow rate through the first pump 300 is greater than or equal to five times greater than the flow rate through the second pump 302.

As a result, a parcel of fuel entering the fluid conditioning module 200 from the fuel reservoir 206 will likely flow through the first filter 304 multiple times before advancing to the engine 104 via the second pump 302 and the second filter 306, thereby improving fuel quality with each successive pass through the first filter 304. While some conventional systems may effect so-called "kidney loop" operation with a separate system that recirculates fuel back to a fuel reservoir, Applicants discovered packaging and cost advantages by incorporating the fluid recirculation loop 328 into the fluid conditioning module 200 without recirculation to the fuel reservoir 206. Instead, the second pump 302 takes suction from the fluid node 324, which is in fluid communication with the outlet port 322 of the first filter 304. In turn, Applicants have identified improvements in fuel system component service life, especially for components operating downstream of a high-pressure common rail pump 252 (e.g., high-pressure common rail fuel injectors 254) within established limits for fuel system packaging size and cost.

Accordingly, during operation of the fluid conditioning module, a first flow of fuel enters the inlet 312 of the first pump 300. The first flow of fuel may have originated from the inlet port 202 to the fluid conditioning module 200, the fluid recirculation loop 328, the pressure regulating valve 350, or combinations thereof. The first pump 300 drives the first flow of fuel through the first filter 304 and back to the fluid node 324.

At node 324, the first flow of fuel may be split into a second flow of fuel that proceeds back to the inlet 312 of the first pump 300, and a third flow of fuel that proceeds to the inlet 330 of the second pump 302. According to an aspect of the disclosure, the second flow of fuel constitutes about 50-75% of the first flow of fuel, with the balance proceeding to the inlet 330 of the second pump 302.

Improvements to filtration performance are further realized by pressurization of the fuel entering the first filter 304 by the first pump 300, which enables the use of finer filtration media in the first filter 304, the second filter 306, or both. For example, while some conventional approaches may only accommodate 10 µm filtration media within prescribed design constraints, aspects of the present disclosure enable use of finer 4 µm filtration media within the same design constraints; thereby further improving filtration performance and fuel quality. According to an aspect of the disclosure, the first filter 304 includes a single stage of 4 µm filtration media. According to another aspect of the disclosure, the first filter 304 includes a single stage of 4 µm filtration media, and the second filter includes two stages of 4 µm filtration media arranged in series. According to another aspect of the disclosure, the two stages of 4 µm filtration media in the second filter 306 are arranged coaxially in series with one another. However, persons having skill in the art will appreciate that either the first filter 304 or the second filter 306 may include multiple filter elements in a single filter housing, multiple filter housings, or combinations thereof.

According to an aspect of the disclosure, the module controller 310 is configured to operate the first pump 300 with a discharge pressure at the outlet 316 up to about 18 psi (125 kPa). According to another aspect of the disclosure, the module controller 310 is configured to operate the second pump 302 with a discharge pressure at the outlet 334 of about 87 psi (600 kPa). Thus, it will be appreciated that the fluid conditioning module 200 does not include a high-pressure common rail pump capable of increasing fuel pressure to the final injection pressure. Instead, according to some aspects of the disclosure, the fluid conditioning module 200 performs a low-pressure transfer function to supply high-quality fuel to a high-pressure common rail pump 252.

The module controller 310 is configured to operate the first pump 300 at a flow rate that is higher than a flow rate of the second pump 302, and the module controller 310 may achieve this result in a number of ways depending upon the application.

Referring to FIG. 3, where both the first pump 300 and the second pump 302 are driven by a single motor 308, the first pump 300 may be selected to have a pumping characteristic such that, at the target pressure rise across the first pump, the flow rate through the first pump 300 is greater than the flow rate through the second pump 302, when the second pump 302 is also operated at its target pressure rise and the second pump 302 is operated at the same speed as the first pump 300. Accordingly, for the aforementioned pumping characteristics and same-speed operation of the first pump 300 and the second pump 302, the module controller 310 is configured to operate the first pump 300 at a higher flow rate than that of the second pump 302 by operating both the first pump 300 and the second pump 302 at the same speed.

Alternatively, as discussed above, the motor 308 may include gearing 374, such that the first pump 300 operates at a higher speed than the second pump 302 for any given operating speed of the motor 308. Accordingly, for the configuration where the first pump 300 and the second pump 302 have substantially the same pumping characteristic, operating the first pump 300 at a higher speed than the second pump 302, as a result of the gearing 374, the controller may be configured to operate the first pump 300 at a higher flow rate than that of the second pump 302 by operating the motor 308 at a given speed or range of speeds. Further, it will be appreciated that the gearing 374 may be combined with different pumping characteristics for the first pump 300 and the second pump 302 to achieve the desired relative flow rates between the first pump 300 and the second pump 302.

Referring now to FIG. 4, where the first pump 300 and the second pump 302 are operated independently by separate motors 400 and 402, respectively, it will be appreciated that the module controller 310 may be configured to tailor the flow rate of the first pump 300 relative to the flow rate of the second pump 302 by operating the first motor 400 and the second motor 402 at different speeds. As discussed previously, the first motor 400 and the second motor 402 may be variable speed motors, for example, and the module controller 310 may tailor the speeds of the first motor 400 and the second motor 402 to achieve the desired relative flow rates from the first pump 300 and the second pump 302.

Alternatively, if one of the first motor 400 and the second motor 402 were a variable speed motor and the other were a fixed speed motor, the module controller 310 could tailor the relative flow rates between the first pump 300 and the second pump 302 by varying the speed of the motor having variable speed capability. Further still, if the first motor 400 and the second motor 402 were each fixed speed motors, then the fixed speeds of the two motors could be selected in combination with the pumping characteristics of the first pump 300 and the second pump 302 to effect the desired relative flow rates between the first pump 300 and the second pump 302. Accordingly, the module controller 310 would be configured to operate the first pump 300 at a higher flow rate than the second pump 302 by operating the two fixed speed motors 400, 402 at different respective fixed speeds.

The module controller 310 may be configured to monitor the operating speed of the motor 308, the first motor 400, the second motor 402, or combinations thereof, for purposes of identifying a filter loading level of the first filter 304, the second filter 306, or both. Further, the module controller 310 may be configured to monitor a signal from the pressure sensor 376 and compare the pressure signal to a prescribed threshold value. The signal from the pressure sensor 376 dropping below the prescribed threshold value may be indicative a high loading state of the first filter 304, the second filter 306, or both. In response to identifying a high loading state of filters within the fluid conditioning module 200, the module controller 310 may be configured to transmit a signal to the machine controller 130 or a display in the machine cab 122 informing an operator of the high filter loading condition within the fluid conditioning module 200.

Electrically driven pumps 300, 302 within the fluid conditioning module 200 may advantageously facilitate priming after filter service, as the engine need not be running to drive either the first pump 300, the second pump 302, or both, but instead use electrical energy stored in a battery to operate the fluid conditioning module 200. Similarly, electrically driven pumps 300, 302 may provide advantages with respect to starting the IC engine 104, because the electrically driven pumps 300, 302 do not require shaft power from the engine to pressurize the high pressure fuel system 250 prior to starting the IC engine 104.

It will be appreciated that standardized, modular, and compact nature of the fluid conditioning module 200 facilitates application and installation engineering, particularly in light of only three connections between the machine 100 and the fluid conditioning module 200, namely: the inlet port 202, the outlet port 210, and the power port 214. Further, the compact and modular design of the fuel conditioning module 200 advantageously lends itself for mounting on a fuel tank or the chassis 114 of a machine 100, thereby avoiding the higher vibration environment of the IC engine 104. Applicants have discovered that vibration may diminish filtration performance through disruption of filter cake captured on filter media of the first filter 304 or the second filter 306.

Any of the methods or functions described herein may be performed by or controlled by the module controller 310. Further any of the methods or functions described herein may be embodied in a machine-readable non-transitory medium for causing the module controller 310 to perform the methods or functions described herein. Such machine-readable non-transitory media may include magnetic disks, optical discs, solid state disk drives, combinations thereof, or any other machine-readable non-transitory medium known in the art. Moreover, it will be appreciated that the methods and functions described herein may be incorporated into larger control schemes for the engine 104, the machine 100, or combinations thereof, including other methods and functions not described herein. Accordingly, the module controller 310 may be operatively coupled to the machine controller 130 for communication therewith, or at least partly embodied within the machine controller 130.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A fluid conditioning system, comprising:
   a first filter mount having a first filter inlet port and a first filter outlet port;
   a second filter mount having a second filter inlet port;
   a first motor;
   a first pump operatively coupled to the first motor via a first shaft,
      an outlet of the first pump being fluidly coupled to the first filter inlet port via a first filter inlet conduit that extends from the outlet of the first pump to the first filter inlet port and that does not include the second filter inlet port, such that the first filter inlet port receives a discharge pressure from the outlet of the first pump,
      an inlet of the first pump being fluidly coupled to the first filter outlet port via a first filter outlet conduit;
   a second pump,
      an inlet of the second pump being fluidly coupled to the first filter outlet port via the first filter outlet conduit,
      an outlet of the second pump being fluidly coupled to the second filter inlet port via a second filter inlet conduit that extends from the outlet of the second pump to the second filter inlet port and that does not include the first filter inlet port, the second filter inlet port being disposed downstream of the outlet of the second pump along a flow direction extending from the inlet of the second pump toward the outlet of the second pump; and
   a block defining the first filter mount and the second filter mount, the first pump being fastened to the block, the first filter inlet conduit being defined by the block,
   wherein the first filter outlet conduit is defined by the block,
   wherein the second pump is fastened to the block, and the second filter inlet conduit is defined by the block,
   wherein the first pump and the second pump are fastened to a first side of the block, and
   wherein the first filter inlet port and the second filter inlet port are defined by apertures through a second side of the block, the second side of the block being opposite the first side of the block.

2. The fluid conditioning system of claim 1, wherein the second pump is mechanically coupled to the first motor.

3. The fluid conditioning system of claim 1, further comprising a second motor mechanically coupled to the second pump.

4. The fluid conditioning system of claim 1, wherein the inlet of the first pump is fluidly coupled to a fluid reservoir via a flow path that does not include the second pump,
   the inlet of the second pump is fluidly coupled to the fluid reservoir via a flow path that does not include the first pump, and
   the first filter inlet conduit does not include the fluid reservoir.

5. The fluid conditioning system of claim 1, further comprising a pressure regulating valve, an outlet port of the second filter mount being fluidly coupled to the first filter inlet conduit via the pressure regulating valve along a flow path that includes the second filter mount, the pressure regulating valve, and the first filter inlet conduit disposed fluidly in series with one another,
   wherein the pressure regulating valve is disposed downstream of the second filter mount along the flow direction extending from the inlet of the second pump toward the outlet of the second pump, and
   wherein the first filter inlet conduit is disposed downstream of the pressure regulating valve along the flow direction extending from the inlet of the second pump toward the outlet of the second pump.

6. The fluid conditioning system of claim 1, further comprising a controller operatively coupled to the first motor, the controller being configured to operate the first pump at a flowrate that is higher than a flowrate of the second pump.

7. The fluid conditioning system of claim 1, wherein an outlet port of the second filter mount is fluidly coupled to an inlet of a common rail fuel pump via a common rail supply conduit, the outlet port of the second filter mount being disposed fluidly in series with the common rail fuel pump, the outlet port of the second filter mount being disposed upstream of the common rail fuel pump along a flow direction that extends from an inlet of the common rail fuel pump toward an outlet of the common rail fuel pump.

8. The fluid conditioning system of claim 1, wherein the first motor is operatively coupled to the second pump via a second shaft.

9. The fluid conditioning system of claim 8, wherein a longitudinal axis of the first shaft is substantially parallel to a longitudinal axis of the second shaft.

10. The fluid conditioning system of claim 1, further comprising a second motor operatively coupled to the second pump via a second shaft.

11. The fluid conditioning system of claim 1, wherein a first direction extends from the first pump toward the second pump, and the first filter inlet port is located beside the second filter inlet port along the first direction.

12. The fluid conditioning system of claim 11, wherein the first motor is disposed between the first pump and the second pump along the first direction.

13. The fluid conditioning system of claim 12, further comprising a second motor operatively coupled to the second pump via a second shaft, the second motor being disposed between the first motor and the second pump along the first direction.

14. The fluid conditioning system of claim 1, further comprising:
   a first filter removably coupled to the block by the first filter mount; and
   a second filter removably coupled to the block by the second filter mount,
   wherein the first filter mount is configured to removably fasten the first filter to the block such that the first filter inlet port of the block is in fluid communication with an inlet of the first filter, and such that the first filter outlet port of the block is in fluid communication with an outlet of the first filter, wherein the second filter mount further has a second filter outlet port, and wherein the second filter mount is configured to removably fasten the second filter to the block such that the second filter inlet port of the block is in fluid communication with an inlet of the second filter, and such that the second filter outlet port of the block is in fluid communication with an outlet of the second filter.

15. The fluid conditioning system of claim 6, further comprising a pressure sensor in fluid communication with an outlet port of the second filter mount via a second filter outlet conduit, the pressure sensor being operatively coupled to the controller, the controller being further configured to adjust the flowrate of the second pump based at least partly on a signal from the pressure sensor.

16. The fluid conditioning system of claim 1, wherein the outlet of the first pump is directly coupled to the first filter inlet port via the first filter inlet conduit.

17. The fluid conditioning system of claim 16, wherein the outlet of the second pump is directly coupled to the second filter inlet port via the second filter inlet conduit.

18. A method for conditioning a fluid through a fluid conditioning system, the fluid conditioning system including a first filter mount having a first filter inlet port and a first filter outlet port, a second filter mount having a second filter inlet port, a first motor, a first pump operatively coupled to the first motor via a first shaft, an outlet of the first pump being fluidly coupled to the first filter inlet port via a first filter inlet conduit that extends from the outlet of the first pump to the first filter inlet port and that does not include the second filter inlet port, such that the first filter inlet port receives a discharge pressure from the outlet of the first pump, an inlet of the first pump being fluidly coupled to the first filter outlet port via a first filter outlet conduit, a second pump, an inlet of the second pump being fluidly coupled to the first filter outlet port via the first filter outlet conduit, an outlet of the second pump being fluidly coupled to the second filter inlet port via a second filter inlet conduit that extends from the outlet of the second pump to the second filter inlet port and that does not include the first filter inlet port, the second filter inlet port being disposed downstream of the outlet of the second pump along a flow direction extending from the inlet of the second pump toward the outlet of the second pump, and a block defining the first filter mount and the second filter mount, the first pump being fastened to the block, the first filter inlet conduit being defined by the block, wherein the first filter outlet conduit is defined by the block, wherein the second pump is fastened to the block, and the second filter inlet conduit is defined by the block, wherein the first pump and the second pump are fastened to a first side of the block, and wherein the first filter inlet port and the second filter inlet port are defined by apertures through a second side of the block, the second side of the block being opposite the first side of the block, the method comprising:

pumping a fluid flow through the first pump;

filtering the fluid flow through a first filter mounted to the first filter mount;

recirculating a first portion of the fluid flow through the first filter via the first pump;

pumping a second portion of the fluid flow through the second pump, the second portion of the fluid flow being less than the first portion of the fluid flow; and filtering the second portion of the fluid flow through a second filter mounted to the second filter mount.

* * * * *